(12) United States Patent
Ueda et al.

(10) Patent No.: US 6,994,263 B2
(45) Date of Patent: Feb. 7, 2006

(54) IC CARD

(75) Inventors: Eiji Ueda, Hiroshima (JP); Futoshi Nakabe, Hiroshima (JP); Masahiro Kawasaki, Hiroshima (JP); Shizuka Sakamoto, Hiroshima (JP); Motoji Ohmori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 166 days.

(21) Appl. No.: 10/607,500

(22) Filed: Jun. 27, 2003

(65) Prior Publication Data

US 2004/0050942 A1 Mar. 18, 2004

(30) Foreign Application Priority Data

Jun. 28, 2002 (JP) ............................. 2002-189892

(51) Int. Cl.
*G06K 19/06* (2006.01)
(52) U.S. Cl. ....................................... 235/492; 235/487
(58) Field of Classification Search ................ 235/492, 235/487–490; 705/1, 41–44
See application file for complete search history.

(56) References Cited

U.S. PATENT DOCUMENTS

| 4,849,617 A | * | 7/1989 | Ueda ........................... 235/492 |
| 5,004,899 A | * | 4/1991 | Ueda ........................... 235/492 |
| 5,884,271 A | * | 3/1999 | Pitroda ........................... 705/1 |
| 6,719,570 B2 | * | 4/2004 | Tsuchioka .................. 439/76.1 |
| 6,739,515 B1 | * | 5/2004 | Wallace ....................... 235/492 |
| 6,865,086 B2 | * | 3/2005 | Gochnour et al. ........... 361/737 |
| 2002/0137386 A1 | * | 9/2002 | Abe et al. .................... 439/377 |
| 2004/0211843 A1 | * | 10/2004 | Boker ........................ 235/492 |

FOREIGN PATENT DOCUMENTS

| JP | 02003346110 A | * | 12/2003 |
| JP | 02003346978 A | * | 12/2003 |

\* cited by examiner

*Primary Examiner*—Diane I. Lee
*Assistant Examiner*—Kimberly D. Nguyen
(74) *Attorney, Agent, or Firm*—McDermott Will & Emery LLP

(57) ABSTRACT

The IC card is capable of providing a plurality of services to an external device on one card, and comprises: a interface for the external device; a switch disposed on the IC card and that selects a service; a memory unit recording a information corresponding to a plurality of services and having a plurality areas each storing different information from another areas in security level; a CPU reading/writing information from/to the memory unit based on the service selected by the switch, and provides the selected service to the external device by way of the interface; a security level judgment unit judging the security level on an access status by the application to the memory areas; and a display unit displaying a kind of selected service or a security level of the service.

7 Claims, 17 Drawing Sheets

FIG. 13

| ACCESS MEMORY AREA | SECURITY LEVEL |
|---|---|
| M1(TRM) | 4 |
| M2(SECURE FLASH) | 3 |
| M3(IDENTIFICATION AREA) | 2 |
| M4(NO-IDENTIFICATION AREA) | 1 |

FIG. 14

| SECURITY LEVEL | DISPLAY PATTERN BITS |
|---|---|
| 4 | 1111 |
| 3 | 1110 |
| 2 | 1100 |
| 1 | 1000 |

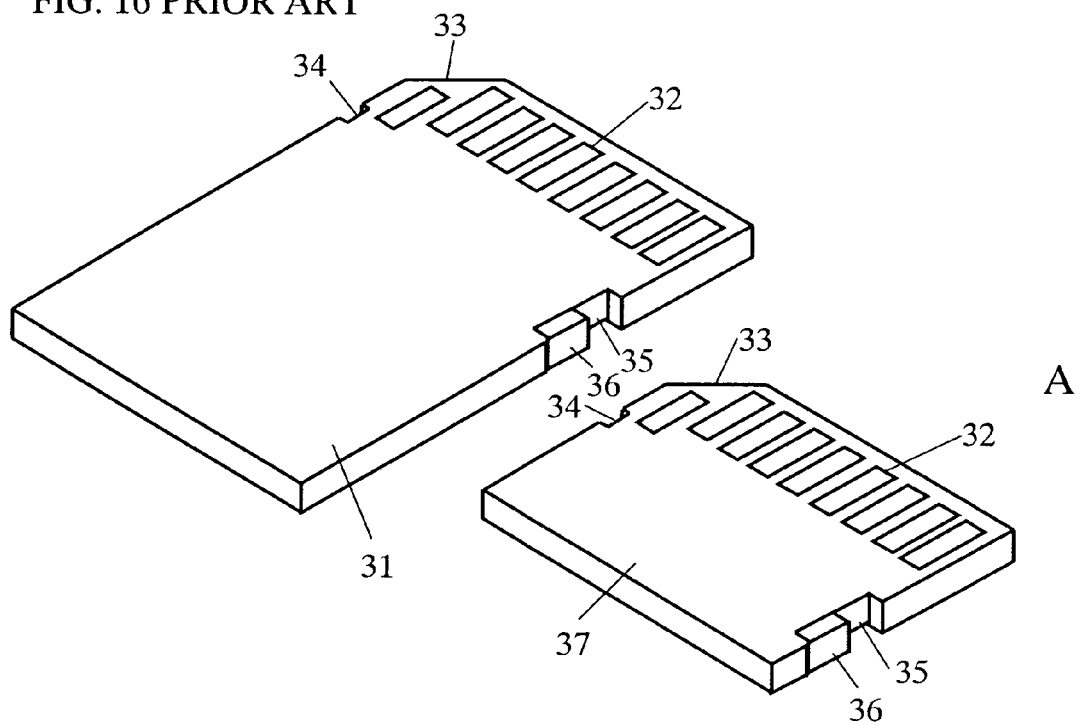
FIG. 16 PRIOR ART
A
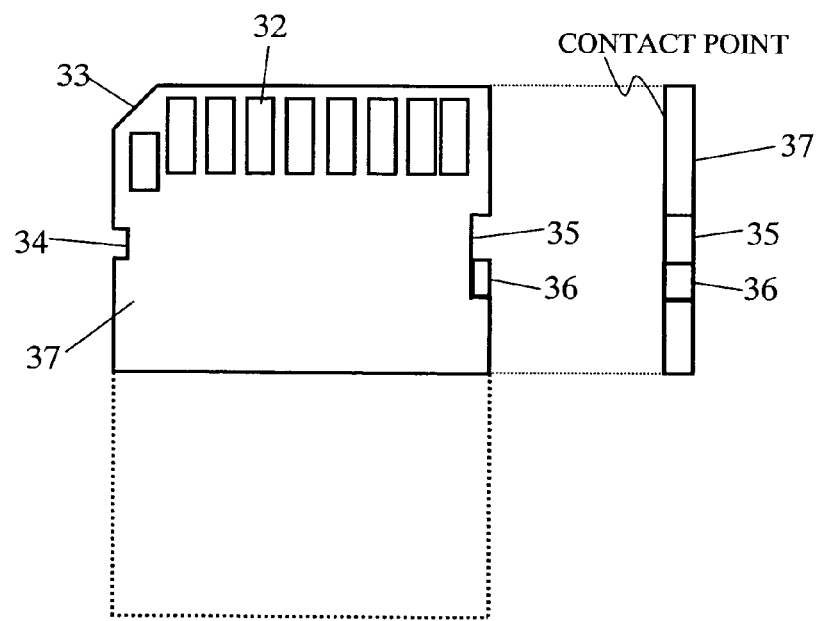
B

FIG. 17 PRIOR ART
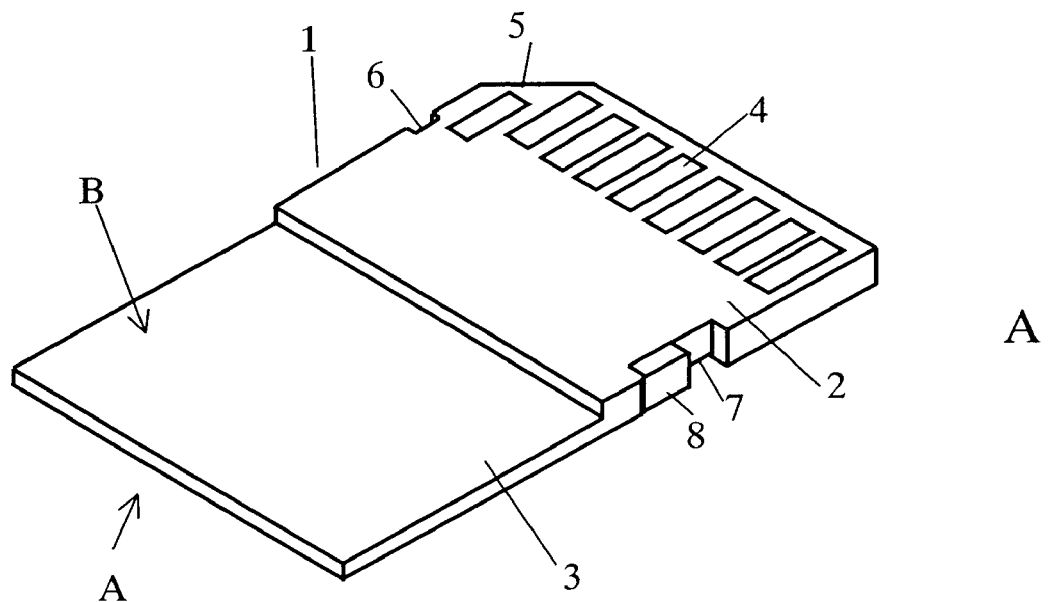
A
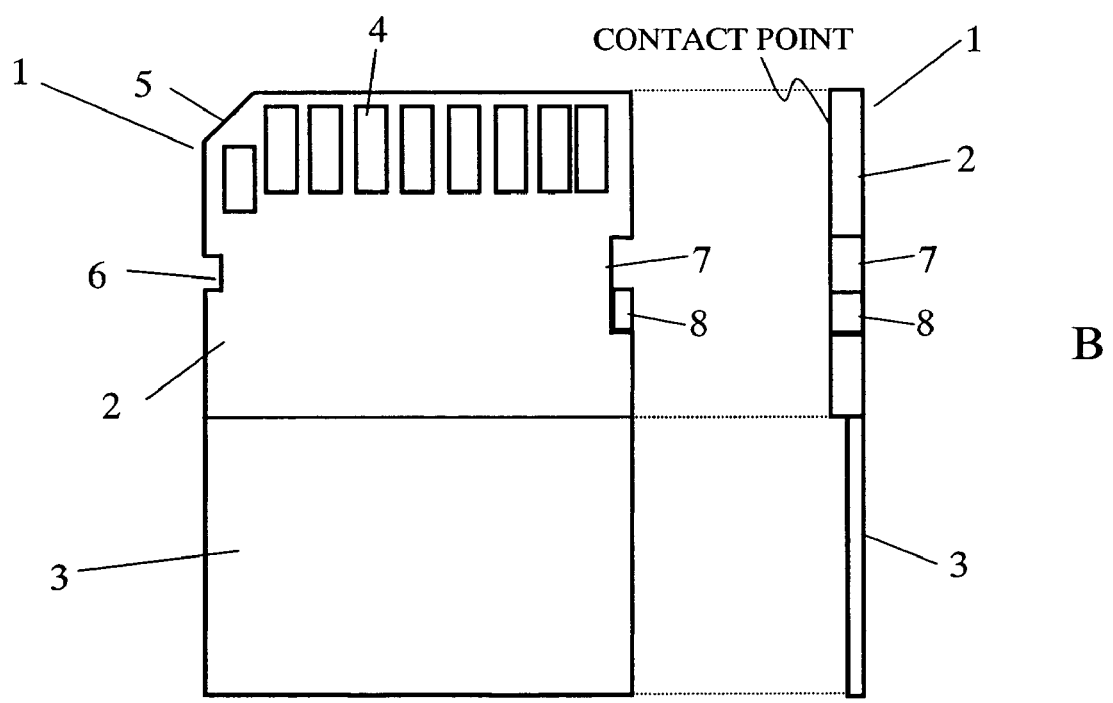
B

IC CARD

BACKGROUND OF THE INVENTION

1. Field of the Invention

The present invention relates to an IC card that has at least a CPU and semiconductor memory and is capable of providing a plurality of services on one card.

2. Description of the Related Art

Recently, compact and lightweight IC cards having a built-in semiconductor memory are widely used. One well-known example is the IC card whose main body is the size of a stamp, as shown on the left side in FIG. 16A.

The IC card that is shown on the left side of FIG. 16A has contacts 32 near the edge on one end on the underneath side of the main body 31 of the IC card, which has a built-in semiconductor memory or the like, and these contacts 32 electrically connect the semiconductor memory or the like with an external device; and a slanted cut out part 33 is formed on one of the corners of the flat main body of the IC card 31, and this cut-out part 33 has an identification function in order to prevent inserting the IC card in the wrong way. Moreover, a concave part 34 is formed on one side of the card body 31 in order firmly hold the IC card when inserted into an external device, and a concave part 35 is formed on the other side in order to allow the write-enable/disable switch 36, which sets whether data can or cannot be written to the semiconductor memory, to freely slide. It is possible to set whether or not to allow data to be written to the semiconductor memory according to the sliding position of the write-enable/disable switch 36.

Here, a multi-purpose IC card that is capable of providing a plurality of services on one card is proposed as the IC card. For example, this is possible by using JavaCard (R), which executes Java (R) processing for IC card and which is advocated by Sun Microsystems, USA.

The multi-purpose IC cards can be used for cards such as credit cards, cash cards, commuter passes, medical-examination cards, insurance card, electronic money, etc. By inserting a multi-purpose IC card into a card holder that is connected to a personal computer, and connecting to the Internet, not only could the card be used to purchase a concert ticket, but that concert ticket itself could be electronically stored on that card, and the multi-purpose card could be used as an electronic ticket at the concert hall.

Even in the case of just a credit function, it is possible to utilize the services from a plurality of credit-service companies with just a single card. The stamp-sized card that is shown on the left side of FIG. 16A can be also used as the multi-purpose IC card. In the explanation below, the IC card is a multi-purpose IC card, so, the multi-purpose IC card will be simply called an IC card unless stated otherwise.

On the other hand, it is desired to make the IC card even more compact. In many cases, the use of IC cards is in portable terminals. For example, in the case of use in a mobile telephone, even stamp-sized IC cards can be considered large.

Therefore, as shown on the right side of the FIG. 16A, an IC card that is half the size of the stamp-sized card is considered. In this case, the size of the card body 37 is made half the size as shown in FIG. 16A, and the rest of the construction is left the same. FIG. 16B shows the shape of the side surface of the IC card shown in FIG. 16A.

However, in the example shown on the right side of FIG. 16A and FIG. 16B, when the length (or width) of the IC card is reduced, there is a possibility that it could be swallowed accidentally by an infant. Moreover, even when there is electrical compatibility with the stamp-sized IC card (left side of FIG. 16A), the shape is different, so when the card is inserted by mistake into a connector of an external device for a stamp-sized IC card, there is a possibility that the IC card could get stuck inside the connector and not be able to be extracted from the device, or there is a possibility that the it will fall inside the external device through a gap in the connector. Therefore, when using an IC card that is half the size of a stamp-sized IC card in a device for a stamp-sized IC card, it is necessary to use an adapter or the like that will make the shape fit the shape of a stamp-sized IC card.

In order to solve the problem mentioned above, a small-volume IC card as shown in FIG. 17 is considered.

This IC card 1 is formed such that the stamp-sized main card body 31 shown on the left side of FIG. 16A is divided into a thick first main-body part 2 and thin main-body part 3; and a first surface side A is continuous from the first main-body part 2 to the second main-body part 3 and is the same flat surface, and the first main-body part 2 protrudes on a second surface side B. Also, similar to as shown in FIG. 16, contacts 4 are formed on one end, a slanted cut-out part 5 is formed on one corner, concave parts 6, 7 are formed on the sides and there is a write-enable/disable switch 8 disposed in the concave part 7.

In other words, by adopting the type of small-volume IC card as shown in FIG. 17, the IC card could become compatible with the conventional stamp-sized IC card.

However, even though the IC card is capable of providing a plurality of services on a single card, it is not possible to determine which services are currently provided by simply looking at the outside of the IC card. Moreover, when that IC card is inserted into a cardholder, determining the provided services becomes even more difficult.

Also, in the case of IC card that has a write-enable/disable switch as described above, there is no card that has a switch for selecting which of the services from the IC card to provide.

SUMMARY OF THE INVENTION

The object of this invention is to provide an IC card that is capable of providing a plurality of services on one card, and for which it is easy to select the services to be provided and determine the kind of the services.

In order to accomplish the object mentioned above, this invention provides an IC card that allows the user to select a service by a switch. A memory unit of the IC card stores information of applications corresponding to the services. When the user selects the service, a CPU executes the application corresponding to the selected service to provide the service to the external device.

A display unit can be further provided with the IC card. The display unit displays a kind of the service provided to the external device.

Also, the memory unit can have a plurality of memory areas each of which stores different information from another areas in security level. In case of that, it is preferable that the IC card has a security level judgment unit. The security level judgment unit judges a security level on an access status to the memory area by the application corresponding to the selected service. And, the display unit displays the security level judged for the service.

The main card body has the first thick plate-shaped main-body part and the second thin plate-shaped main-body part. The first surface of the main body is a continuous flat surface from the first main-body part to the second main-body part, and on the second surface side, the first main-body part protrudes.

For the main card body having such a shape, the switch and the display unit may be disposed on the rising surface of a stepped part where the first main-body part protrudes on the second surface side.

Also, the rising surface to the first main-body part can be a slanted surface that is tapered such that it spreads over the second main-body part with rising in the direction from the first surface side toward the second surface side.

It is also possible to form a mirror surface on all or part of the second surface of the second main-body part. The switch and the display unit are reflected in the mirror surface.

Moreover, all or part of the second main-body part can be transparent, or a through hole can be formed in part of the second main-body part.

BRIEF DESCRIPTION OF THE DRAWINGS

FIG. 13 is a drawing showing one example of a security-level definition table that is used by the IC card of a sixth embodiment of this invention;

FIG. 14 is a drawing showing one example of an LED definition table that is used by the IC card of the sixth embodiment of this invention;

FIGS. 16A and 16B are drawings showing a prior IC card where the left side of FIG. 16A is a perspective drawing showing a prior stamp-sized IC card, the right side of FIG. 16A is a perspective drawing showing an IC card that is half the size of the card on the left side and FIG. 16B is a side view of the IC card of the right side of FIG. 16A; and FIGS. 17A and 17B show another example of an IC card where FIG. 17A is a perspective view and FIG. 17B is a side view.

DESCRIPTION OF THE PREFERRED EMBODIMENTS

The preferred embodiments of this invention will be explained using the drawings. The same reference numbers will be used for parts that are identical to those of the example of prior construction.

(First Embodiment)

The IC card 10*a* of a first embodiment of this invention will be explained with reference to FIG. 1 to FIG. 3. This IC card 10*a* is an IC card capable of providing a plurality of services on one card contains a memory M (this memory is not restricted to a specific type of memory and can be a semiconductor memory, for example) and a CPU 100 that controls the entire IC card 10*a*, reads information from the memory unit M and provides the selected service to an external device 20. The plurality of services here are functions such as a credit card, cash card, commuter pass, medical-examination card, insurance card, electronic money, etc.

Figure 1:
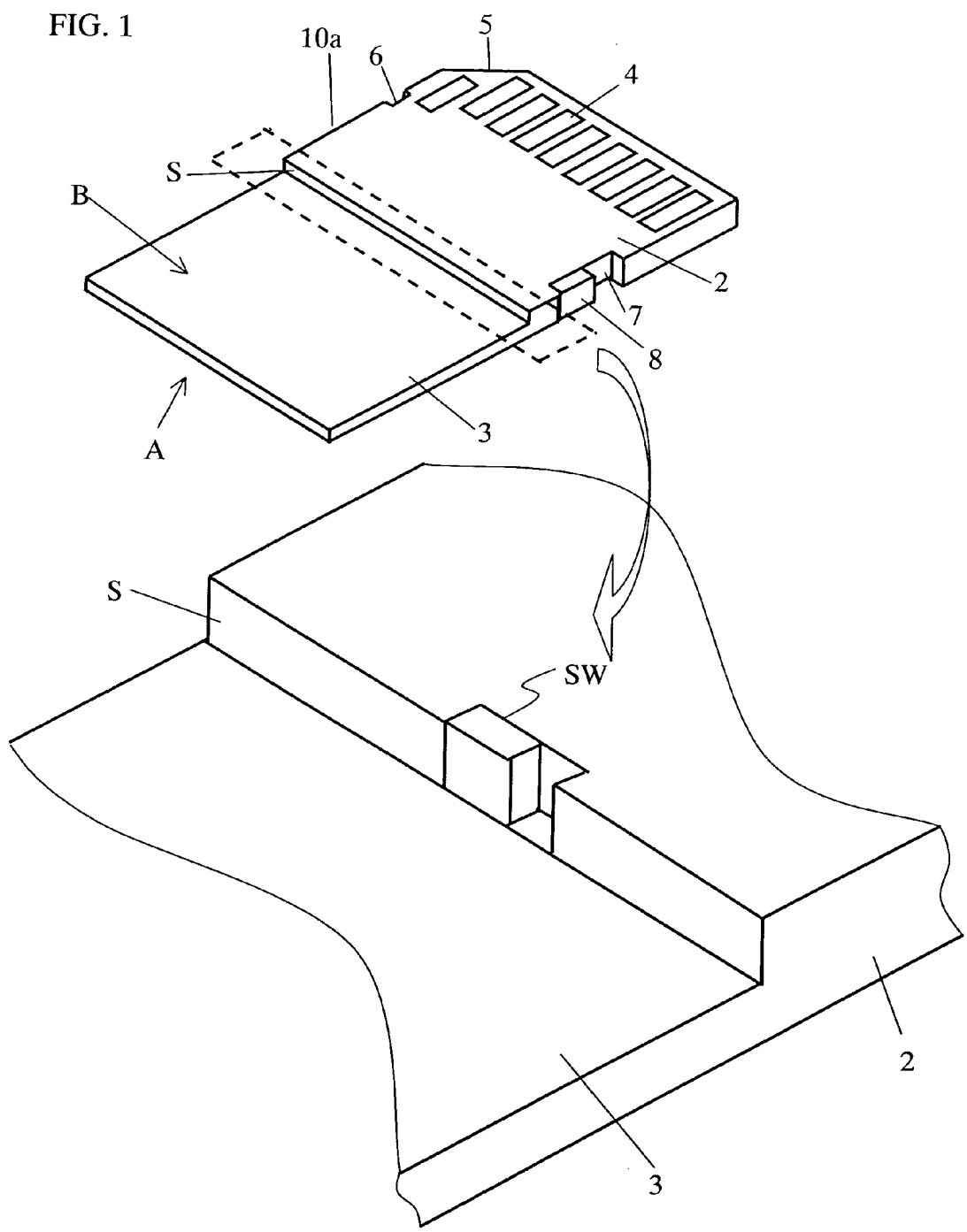
FIG. 1 is a perspective drawing showing the main parts of the IC card of a first embodiment of this invention.

As shown in FIG. 1, this IC card 10*a* is stamp-sized, and when seen from the outside is identical to the IC card 1 shown in FIG. 17A in that the main card body has a thick first main-body part 2 and a thin second main-body part 3, and where a first surface side A is flat surface that is continuous from the first main-body part 2 to the second main-body part 3, and the second main-body part 2 protrudes on a second surface side B. With this construction it is possible to provide an IC card whose size of its outer shape keeps stamp size, but that has small volume. Thus it can be used without an adapter in a device that corresponds to a conventional IC card whose size of its outer shape is stamp size.

Also, near the edge of one end on rear side of the first main-body part 2 of the IC card 10*a* there are the contacts 4 that electrically connect memory unit M, CPU 100 and external device 20, and there is a slanted cut-out part on one of the corners of the flat first main-body part 2, and this provides an identification function to prevent inserting the IC card 10*a* in the wrong way. Moreover, there is a concave part 6 on one side of the first main-body part 2 for securely holding the IC card 10*a* when it is inserted in the external device 20, and there is a concave part 7 on the other side, which allows for the write-enable/disable switch 8, which sets whether or not to enable writing of data to the memory unit M, to freely slide. The slide position of this write-enable/disable switch 8 sets whether or not to enable data to be written to the memory unit M, however it is not an essential part of this embodiment of the invention.

Figure 2:
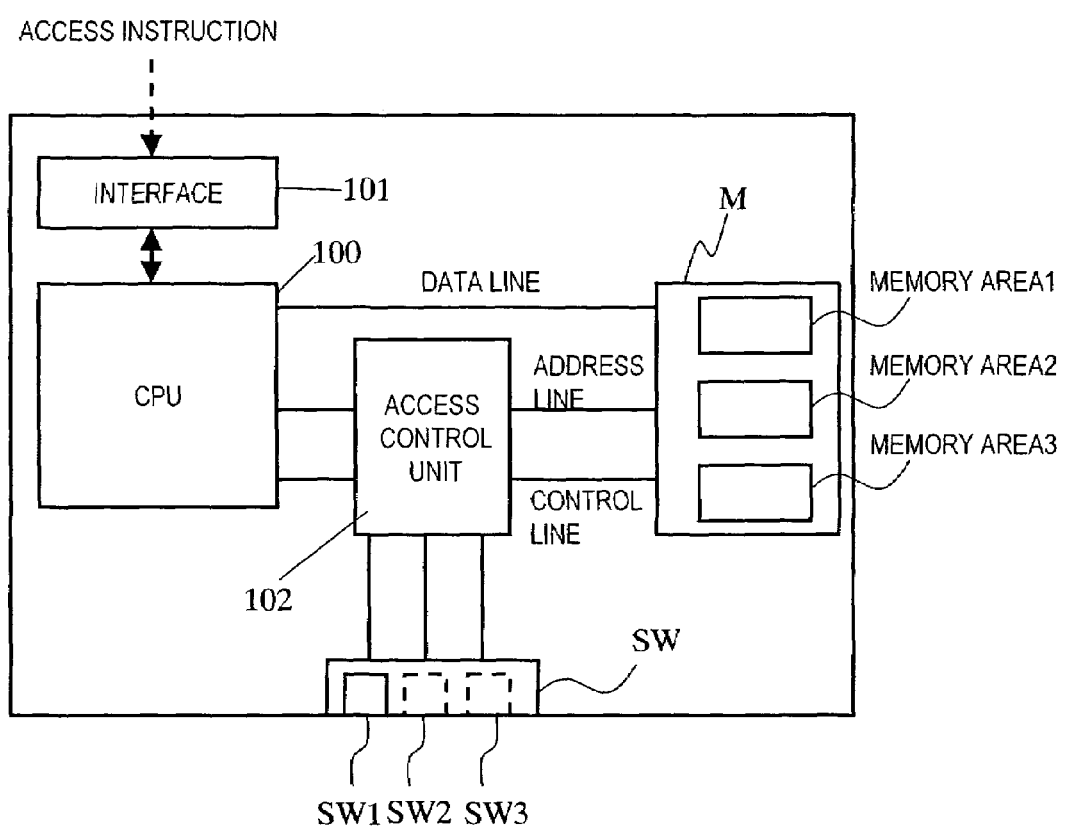
FIG. 2 is a block diagram showing the major electrical structure of the IC card shown in FIG. 1.

FIG. 2 shows the electrical structure of the IC card 10*a* (without the write-enable/disable switch 8).

On the substrate inside the IC card 10*a*, there is an interface 101 that receives access instructions from the external device 20 by way of the contacts 4, a CPU 100, a memory unit M that is operable to record information of applications corresponding to a plurality of services, a switch SW that selects one of the services, and an access-control unit 102 that is located on the address line and control line of the data line, address line and control line between the CPU 100 and the memory unit M and that is operable to receive signals from the switch SW. There are programs and data stored in the MEMORY AREA1 to MEMORY AREA3 in the memory unit M for executing the application corresponding to the services. When the switch SW is set to a specified position (here it can be switched between three positions SW1 to SW3), the access-control unit 102 selects the address and control line that corresponds to the position of the switch SW and sets the memory area that can be accessed by the CPU 100, and it becomes possible for the CPU 100 to access just the selected memory area. It is also possible for the CPU 100 to function as the access-control unit 102.

For example, when the user selects the position SW1 of the switch SW, the CPU 100 can access only the MEMORY AREA1 under the action of the access-control unit 102. By storing programs corresponding to a credit card from company X, a credit card from company Y and a credit card from company Z in MEMORY AREA1, MEMORY AREA2 and MEMORY AREA3, respectively, then in this case the credit card for company X is selected. Also, by storing programs for a credit card, cash card and commuter pass in MEMORY AREA1, MEMORY AREA2 and MEMORY AREA3, respectively, then in this case the credit card is selected.

By storing programs and data for applications corresponding to services in the MEMORY AREA1 to MEMORY AREA3 in this way, it is possible to easily select the service to receive using the switch SW disposed on the IC card 10a.

Here, three memory areas corresponding to the services were used, however, the number is not limited to this number. Moreover, instead of one service to each memory area, it is also possible to select one service by selecting a combination of a plurality of memory areas.

By locating the switch SW at a place on the IC card 10a, the user can easily select the desired service externally from the side of the IC card 10a and not from the side of the external device 20, however, particularly, as shown in FIG. 1, it is preferred that the switch SW be disposed on the vertical surface S of the stepped part of the first main-body part 2 that protrudes on the surface side B.

The position of the switch SW makes it possible to easily determine the kind of the service currently provided by the IC card 10a. In addition, as shown in FIG. 3, when the IC card 10a is inserted from the first main-body part 2 and mounted in the cardholder 21 of the external device 20, the service being provided can be easily determined by looking through the insert slot at the status of the switch SW disposed on the vertical surface S.

Moreover, the interface 101 communicates with the external device 20 by way of the contacts 4. However, the interface between the IC card and the external device is not restricted to the contacts interface. The contact-less interface can be used.

(Second Embodiment)

Figure 4:
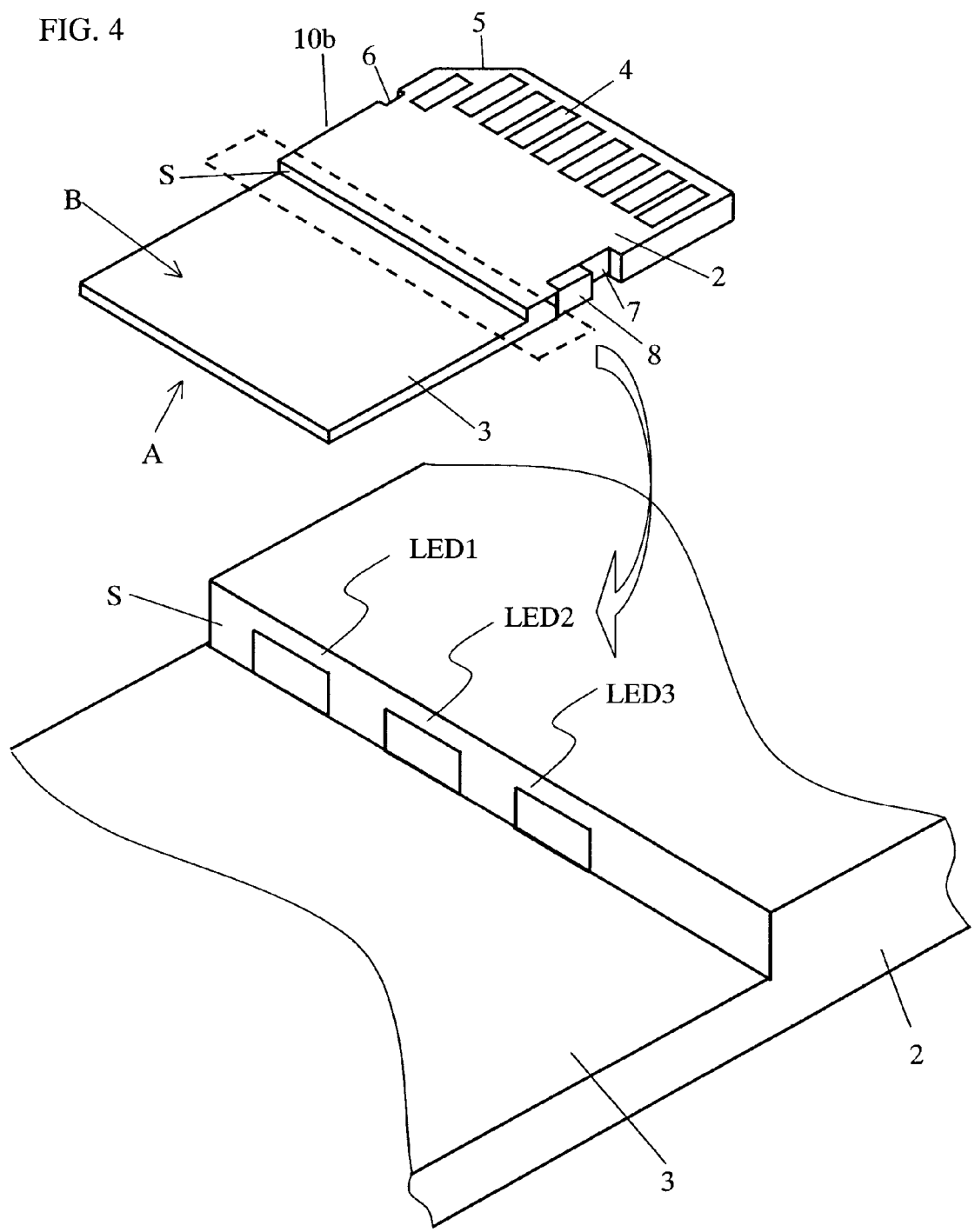
FIG. 4 is a perspective drawing showing the main parts of the IC card of a second embodiment of this invention.

Next, the IC card 10b of a second embodiment of this invention will be explained with reference to FIG. 4 and FIG. 5.

In the case of this IC card 10b, instead of the switch SW on the vertical surface S of the stepped part where the first main-body part 2 protrudes on the second surface side B of the IC card 10 in the first embodiment described above, light-emitting diodes (the embodiment is not particularly limited to light-emitting diodes and any display elements could be used, but hereafter these will be called LEDs (Light Emitting Diodes)) are used as display units to display the kind of the service provided by the external device 20. The same reference numbers will be used for parts that are identical to those of the first embodiment, and any redundant explanation is omitted.

Figure 5:
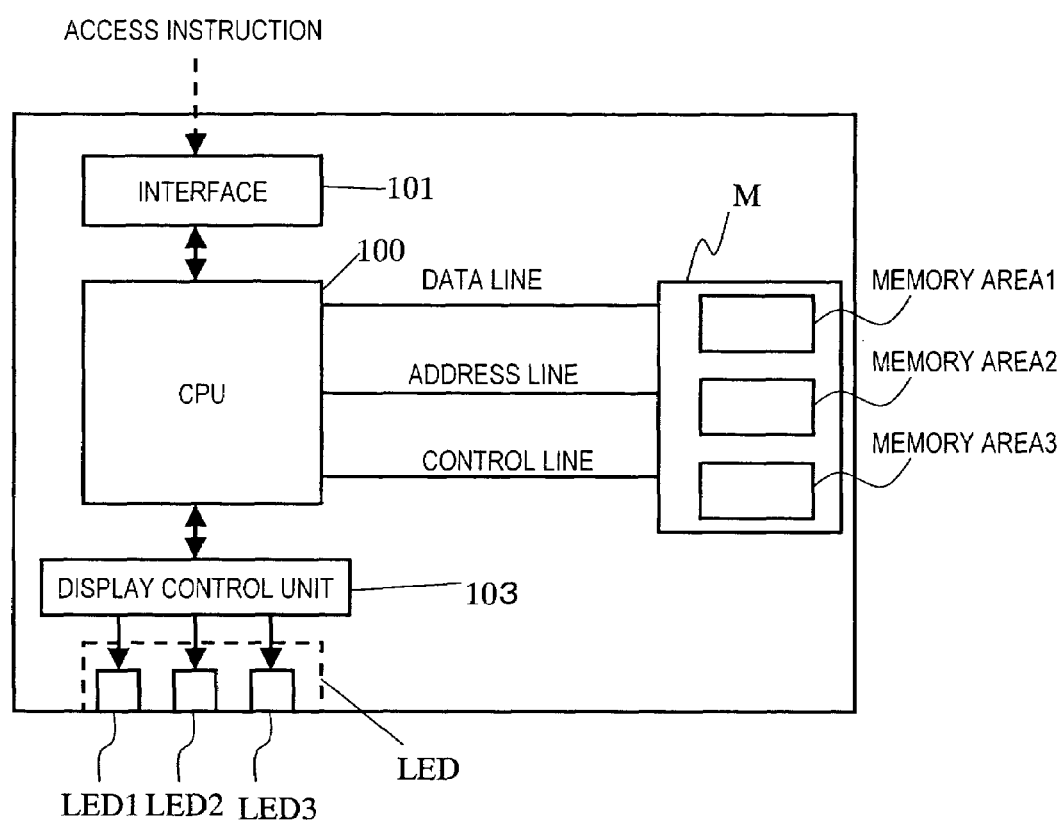
FIG. 5 is a block diagram showing the major electrical structure of the IC card shown in FIG. 4.

FIG. 5 shows the major electrical structure of the IC card 10b.

On the substrate inside the IC card 10b there is an interface 101 that receive access instructions from the external device 20 by way of the contacts 4, a CPU 100, a memory unit M operable to record information corresponding to a plurality of services, three LEDs that display the kind of the provided service, and a display-control unit 103 operable to control the turning ON/OFF of the LEDs. Programs and data for executing an application corresponding to the service are stored in MEMORY AREA1 to MEMORY AREA3 of the memory unit M. The CPU 100 could also perform the function of the display-control unit 103.

For example, when the IC card 10b provides a service according to a request from an external device 20, the display-control unit 103 detects which memory area in the memory unit M is being used and turns ON the corresponding LED.

In the case that the CPU 100 detects a flag (stored in MEMORY AREA2) indicating that the program and data for an application stored in MEMORY AREA2 is executable, and that flag is set, the CPU sends a request to the display-control unit 103 to turn ON the specified LED, or in this case LED2.

The ON/OFF status of the LEDs of the display unit makes it possible to easily determine the current state of the IC card 10b, or in other words, which service is being provided. The LEDs can be disposed anywhere on the surface of the IC card 10b, however, by locating them on the vertical surface S, it is possible to easily determine which service is provided by looking at the ON/OFF status of the LEDs through the insert slot when the IC card 10b is inserted the first main-body part 2 and mounted inside the cardholder 21 of the external device 20 as shown in FIG. 3. Moreover, by doing so, there is no need to install a display unit on the side of the external device 20 operable to display which service the IC card 10b is providing.

It is also possible to dispose the switch SW, described in the first embodiment, together with the LEDs on the vertical surface S.

(Third Embodiment)

Figure 6:
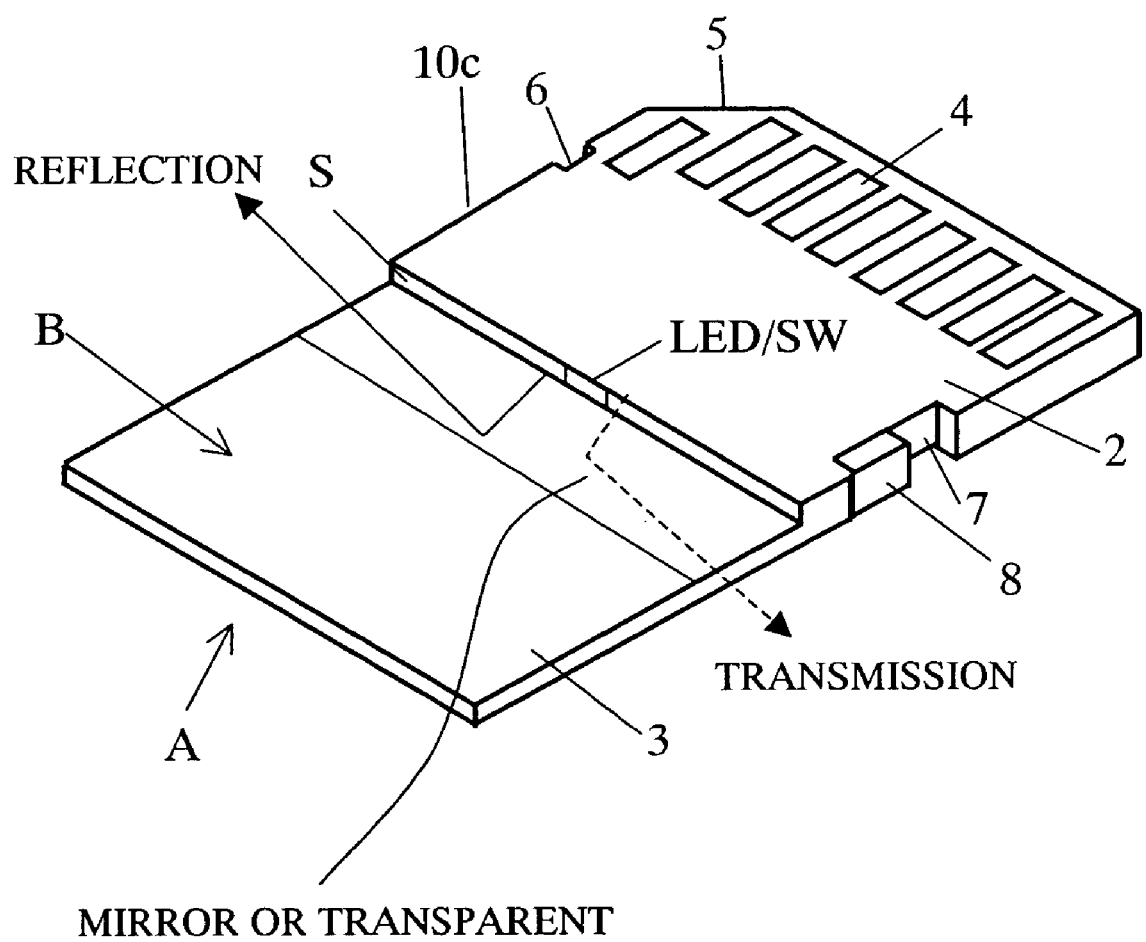
FIG. 6 is a perspective drawing showing the main parts of the IC card of a third embodiment of this invention.

Next, the IC card 10c of a third embodiment of this invention will be explained with reference to FIG. 6.

In the case of this IC card 10c, a mirror surface is formed on part of the flat surface of the second main-body part 3 (here, the mirror surface is formed on the part facing the vertical surface S, however this can be performed for the entire second main-body part 3), and the reflection from the mirror makes it easy to determine the status of the switch SW or LEDs that are disposed on the vertical surface S of the stepped part of the first main-body part 2 as described in the first and second embodiments.

Figure 3:
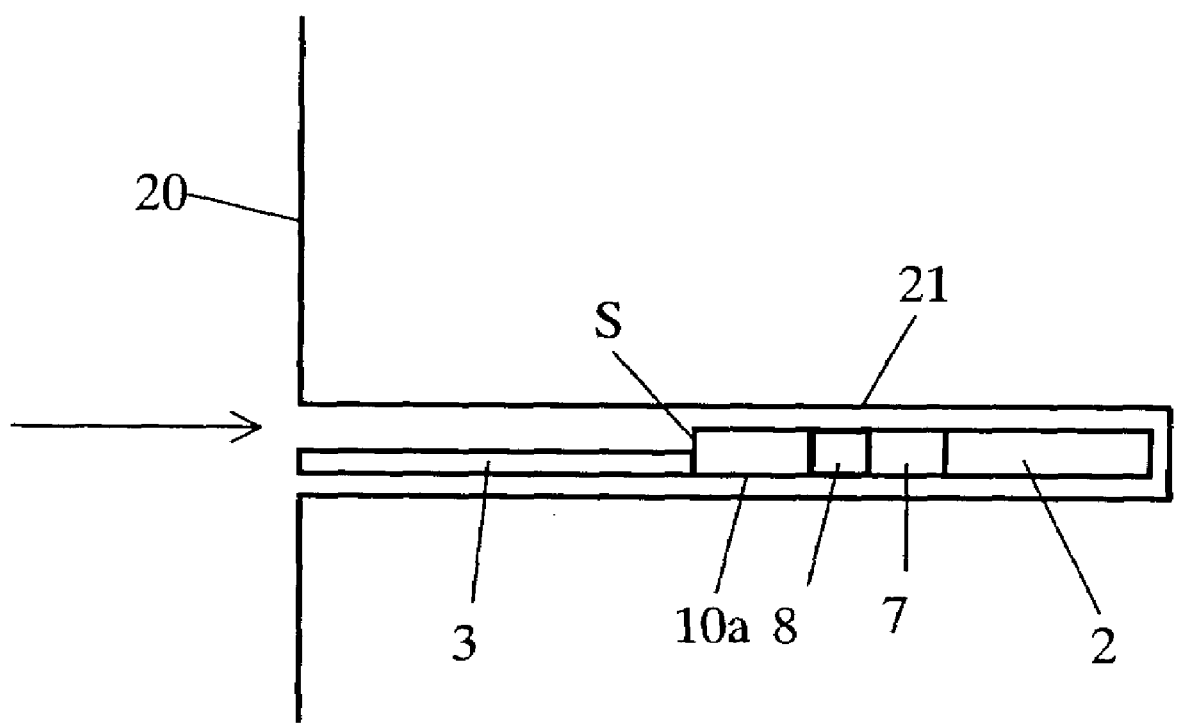
FIG. 3 is a side view of the IC card of FIG. 1 mounted in a cardholder.

Particularly, as shown in FIG. 3, when the IC card 10b is inserted from the first main-body part 2 and mounted in the cardholder 21 of the external device 20 as shown in FIG. 3, it becomes easier to determine the status of the switch SW or LEDs from the reflection of the mirror surface.

Also, instead of forming a mirror surface, it is possible to make part or all of second main-body part 3 transparent, and by taking advantage of this transparency it is possible to determine the status of the switch SW or LEDs.

(Fourth Embodiment)

Figure 7:
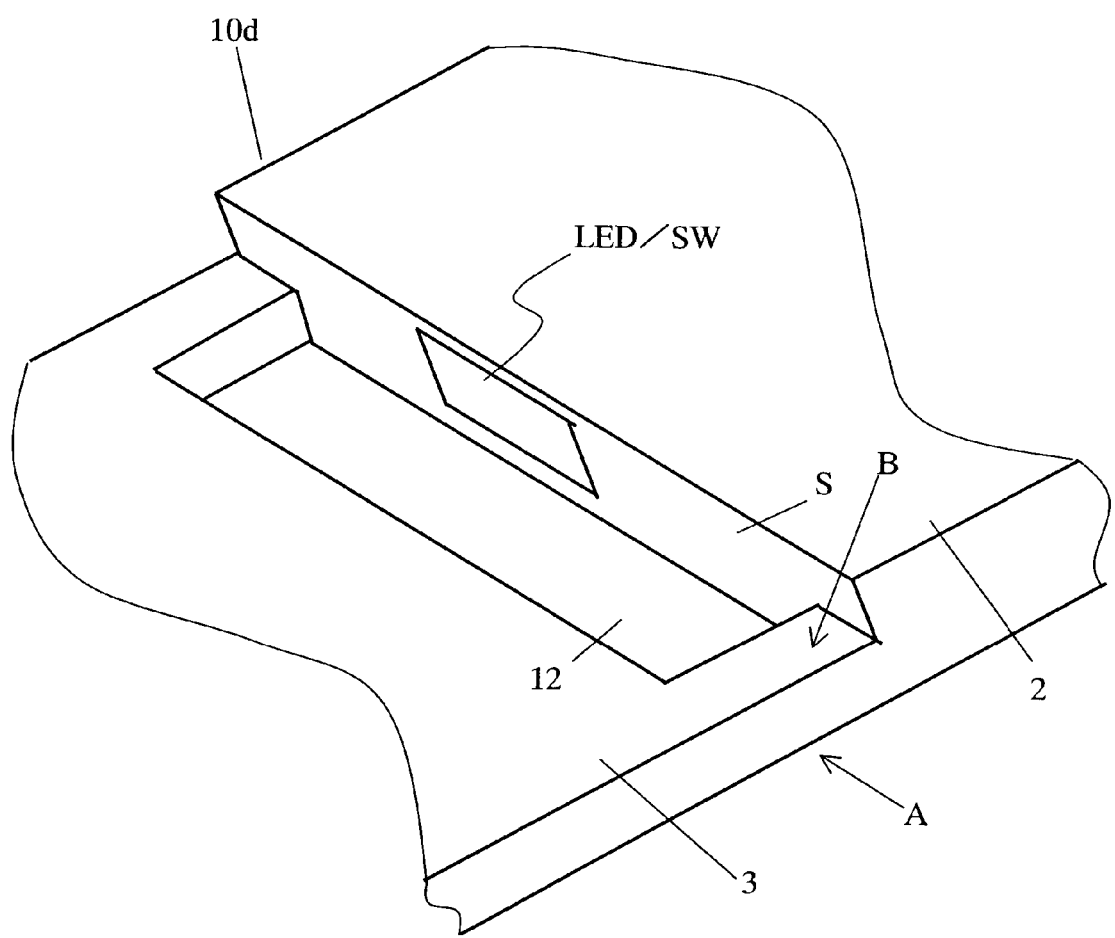
FIG. 7 is a perspective drawing showing the main parts of the IC card of a fourth embodiment of this invention.

Next, the IC card 10d of a fourth embodiment of this invention will be explained with reference to FIG. 7 and FIG. 8.

This IC card 10d, has a through hole 12 formed in part of the second main-body part 3, and this through hole 12 makes it easier to determine from the first surface side A the status of the switch SW or LEDs that are disposed on the vertical surface S of the stepped part of the first main-body part 2 as described in the first and second embodiments.

Figure 8:
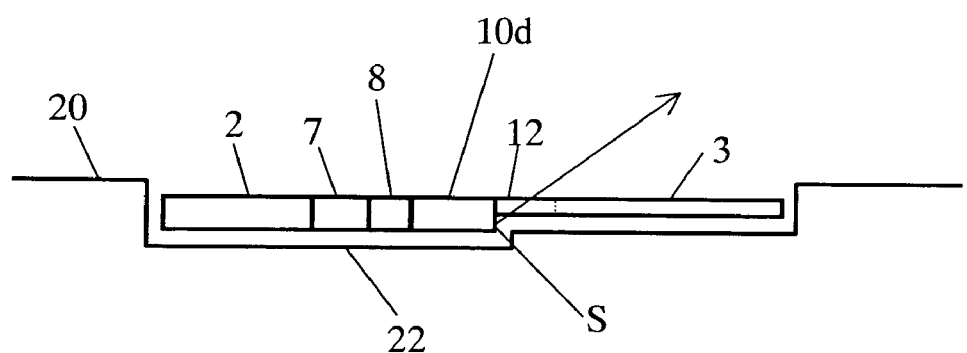
FIG. 8 is a side view of the IC card of FIG. 7 mounted in a cardholder.

This through hole 12 makes it easy to determine the status of the switch SW or LEDs from the first surface side A when the cardholder 22 of the external device 20 is the type that fits around the uneven first main-body part 2 and second main-body part 3, as shown in FIG. 8. Furthermore, in the case of the switch SW disposed on the vertical surface S of the stepped part, it is possible to operate the switch SW by way of the through hole 12.

Moreover, when a plurality of switches SW1 to SW4 or LED1 to LED4 are disposed on the vertical surface S, the through hole 12 does not need to be formed in the second main-body part 3 for all of the switches SW1 to SW4 or LED1 to LED4, but can be formed for just part of the switches or LEDs. In the example shown in FIG. 9, one through hole 12 is formed in a place where the second main-body unit 3 faces two of the four switches SW1 to SW4 or LED1 to LED4.

By forming a through hole 12 at the position of just the switches SW1 and SW2 or LED1 and LED2 in this way, it is not possible to determine the status of or operate the remaining switches SW3 and SW4 or LED3 and LED4. Therefore, when among the services provided there are services that are highly confidential, this can make it more difficult to determine the status or operate the switches or LEDs corresponding to the confidential services. In even the case of such services, if there is nothing to block determining the status of the switches or LEDs corresponding those services, a transparent part could be used in the part of the second main-body unit 3 where there is no through hole 12.

Also, when it is not necessary to perform operations for any of the services, a transparent part can be used for part of the switches or LEDs instead of a through hole 12.

(Fifth Embodiment)

Figure 10:
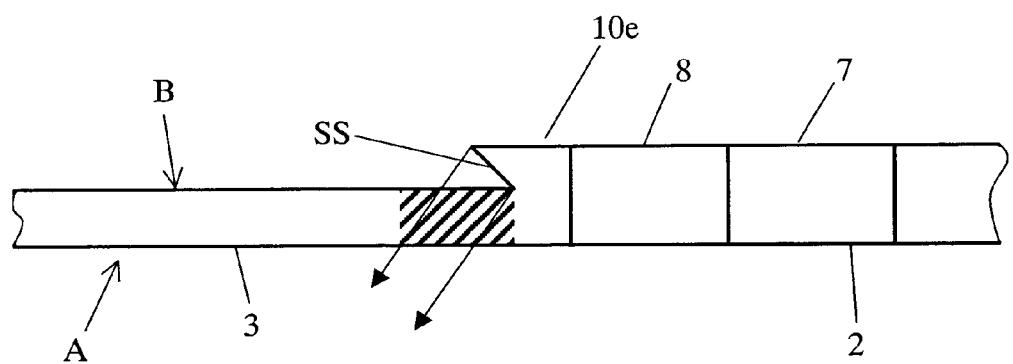
FIG. 10 is a side view showing the main parts of the IC card of a fifth embodiment of this invention.

Next, the IC card 10*e* of a fifth embodiment of this invention will be explained with reference to FIG. 10 and FIG. 11.

Figure 9:
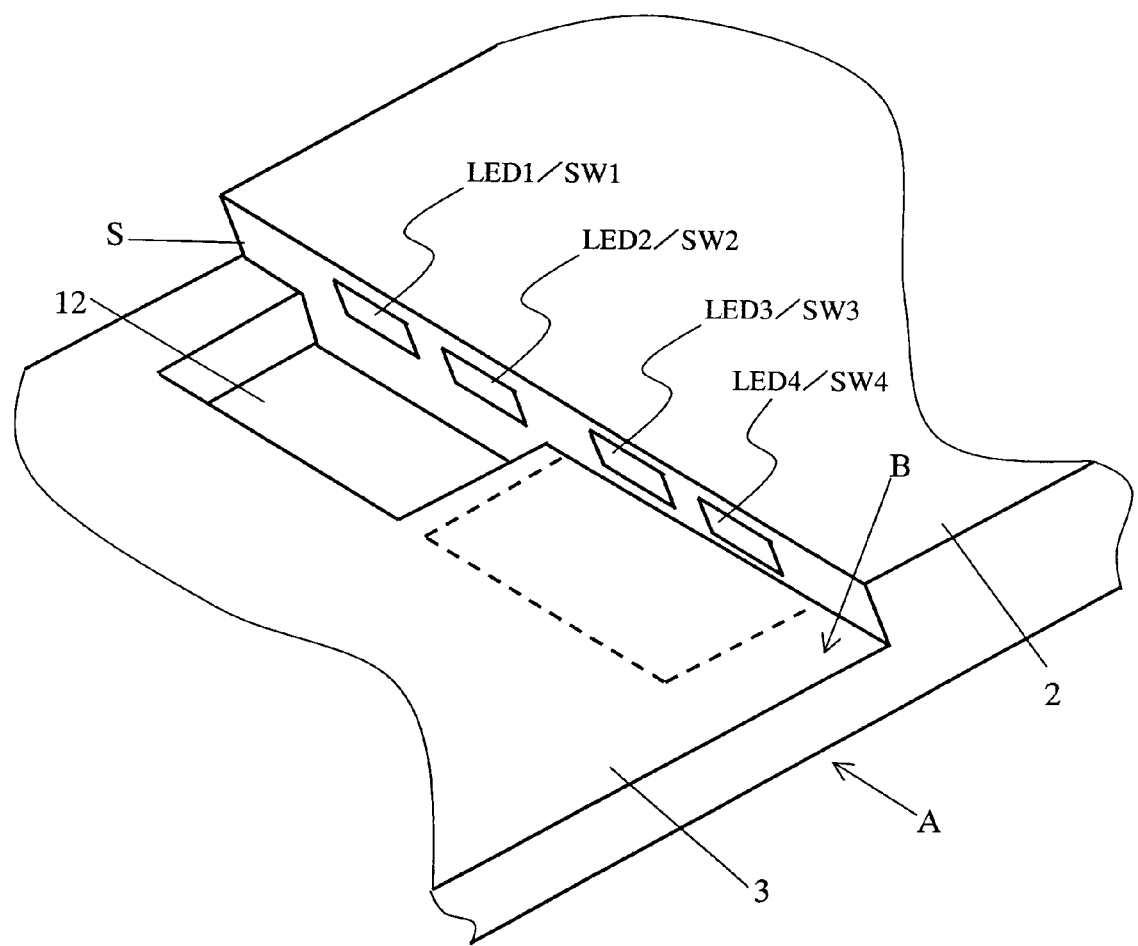
FIG. 9 is a perspective drawing for explaining another form of the IC card shown in FIG. 7.

In the case of this IC card 10*e*, the rising surface SS to the first main-body part 2 is not vertical with respect to the first surface and second surface as was in the case of the IC cards 10*a* to 10*d*, but rather is a slanted surface as shown in FIG. 9 such that as it rises from the first surface side A toward the second surface side B, the slanted surface is tapered such it spreads over the second main-body part 3, or in other words, it is a slanted surface that slants backward from the first main-body part 2 over the second main-body part 3. Moreover, the part of the second main-body part 3 that faces the slanted surface SS is transparent (in the figure, the transparent part is indicated by the dashed line), which makes it possible to more easily determine the status of the switches SW or LEDs from the first surface side A. Instead of the transparent part, it is also possible to form a through hole or a mirror surface.

Figure 11:
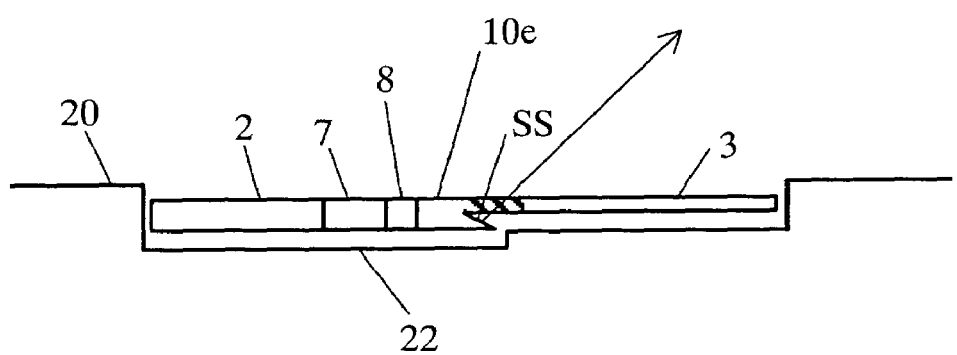
FIG. 11 is a side view of the IC card of FIG. 10 mounted in a cardholder.

In the case of the type of cardholder 22 of the external device 20 that fits around the uneven first main-body part 2 and second main-body part 3 as shown in FIG. 11, this kind of construction makes it possible to determine the status of the switches SW or LEDs from the first surface side A through a transparent part more easily than in the case where the rising surface SS is a vertical surface.

(Sixth Embodiment)

Figure 12:
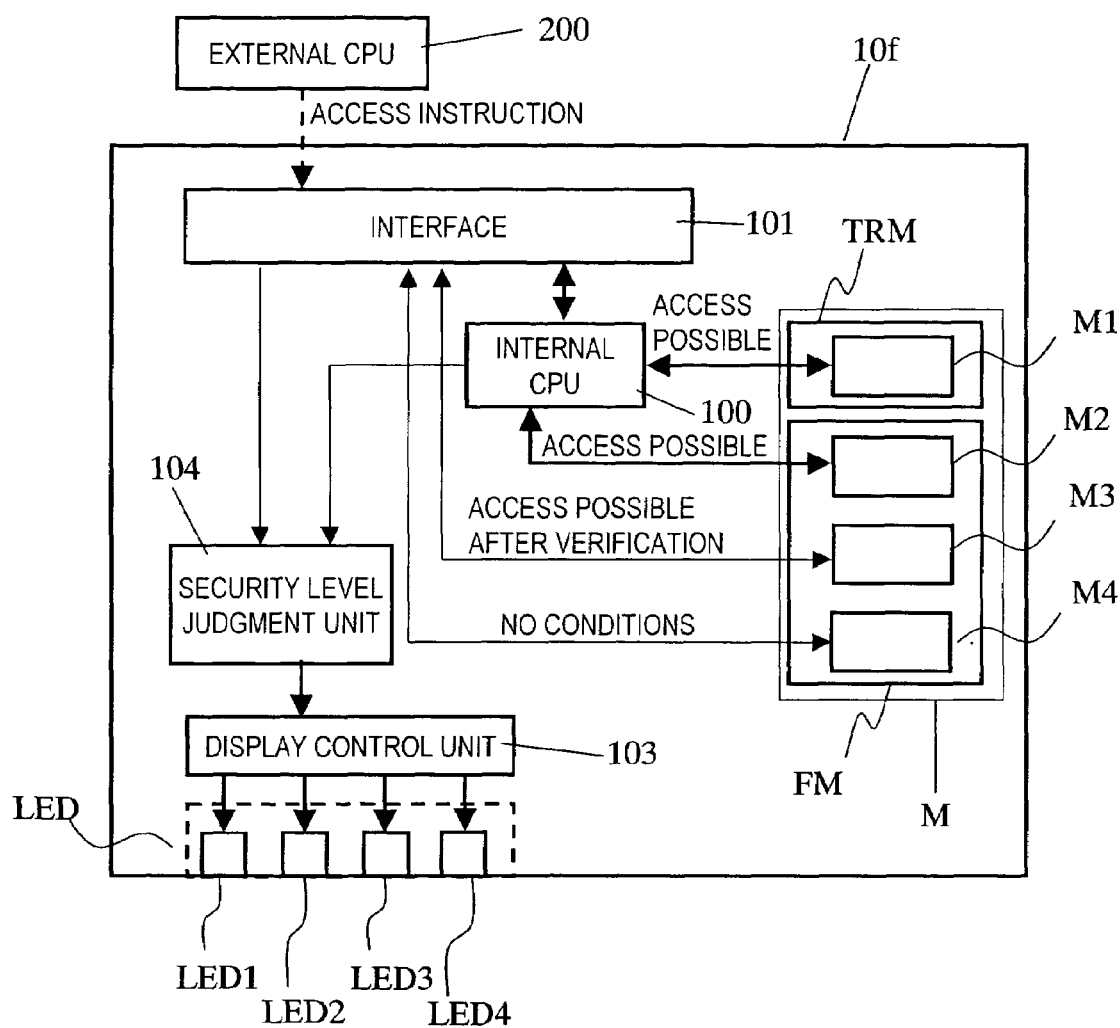
FIG. 12 is a block diagram showing the major electrical structure of the IC card of a sixth embodiment of this invention.

Next, the IC card 10*f* of a sixth embodiment of this invention will be explained with reference to FIG. 12 to FIG. 14.

In the case of this IC card 10*f*, there are four memory areas M1, M2, M3 and M4 having different security levels for the information stored in the memory unit M. The IC card 10*f* expands the function of a conventional memory card, and the memory areas M1 and M2 are used mainly for providing services as an IC card, and the memory areas M3 and M4 are used mainly for storing information as a memory card.

The interface 101 determines according to an access instruction from the external CPU 200 of a PDA (Personal Data Assistant) for example, whether to access the memory areas M1 and M2, or to access the memory areas M3 and M4.

It is possible to access the memory areas M3 and M4 without having to go through an internal CPU 100. The security level for the information stored in memory area M3 is the lowest next to that for memory area M4. In order to access the memory area M3 from an external CPU 200, suitable identification is performed, memory area M4 can be accessed without having to perform identification.

It is not possible to access memory areas M1 and M2 without having to go through the internal CPU 100. It is also possible to perform encryption of the IC card by the internal CPU 100, such that the information stored in memory areas M1 and M2 are protected more securely than the information stored in memory areas M3 and M4. Memory area M2 is contained in a large-capacity non-volatile flash memory together with memory areas M3 and M4, however, memory area M1 is contained in a TRM (Tamper Resistant Module). By containing memory area M1 in the TRM, the information stored in memory area M1 is physically protected as well. Memory area M1 has the highest security level for the stored information, and information, such as digital cache information that could be greatly damaged when there is illegal access or tampering, is stored in memory area M1. The security level for the information stored in memory area M2 is lower than that for the information stored in memory area M1, however, it is sufficient for protecting information such as ticket numbers, purchase receipts or the like.

When using the IC card 10*f* such as this that has a plurality of security levels for the information handled, the user has much interest in which service is being provided, as well as the amount of protection given to that service and the information for it.

In order to satisfy that request, the IC card 10*f* has a security-level-judgment unit 104 operable to judge the security level of the selected service or the corresponding information, and the display-control unit 13 controls the LED display based on the judgment results.

In this embodiment, the security level corresponds to the memory area which is used for the service or in which the data for the service are stored. The security-level-judgment unit 104 obtains information from the interface 101 or internal CPU 100 that indicates which memory area the access instruction is for. By referencing a security-level-definition table as shown in FIG. 13, the security-level-judgment unit 104 converts the information indicating the access status to the memory area, to a security level. For example, when the access instruction is for memory area M1, the highest value '4' is obtained as the security level, and when the access instruction is for memory area M2, the next highest value '3' is obtained.

After determining the security level in this way, the security-level-judgment-unit 104 sets a display pattern based on that security level. In order to set this pattern, it is possible to use an LED-display-definition table as shown in FIG. 14. For example, when the security level is '4', a four-bit string '1111' is obtained, and when the security level is '3', a four-bit string '1110' is obtained.

The four-bit string that is obtained in this way is given to the display-control unit 103, and the display-control unit 103 controls the LED display according to that bit string. The bits of the bit string correspond to either turning ON or turning OFF four LEDs, and the display-control unit 103 turns ON the LED1 to LED4 that have a bit value of '1', and turns OFF those that have a bit value of '0'.

For example, when the bit string '1111' is given to the display-control unit 103, all of the LEDs are turned ON, and when the bit string '0000' is given, none of the LEDs are turned ON.

The LED display is controlled in this way, so the user can check the security level by differences in the display. For example, when unexpectedly all of the LEDs go ON, the user can assume that illegal access is being performed, and take the appropriate countermeasures. Therefore, it is possible to avoid increased damage due to late discovery of illegal access that takes place without the user's knowledge.

(Seventh Embodiment)

Figure 15:
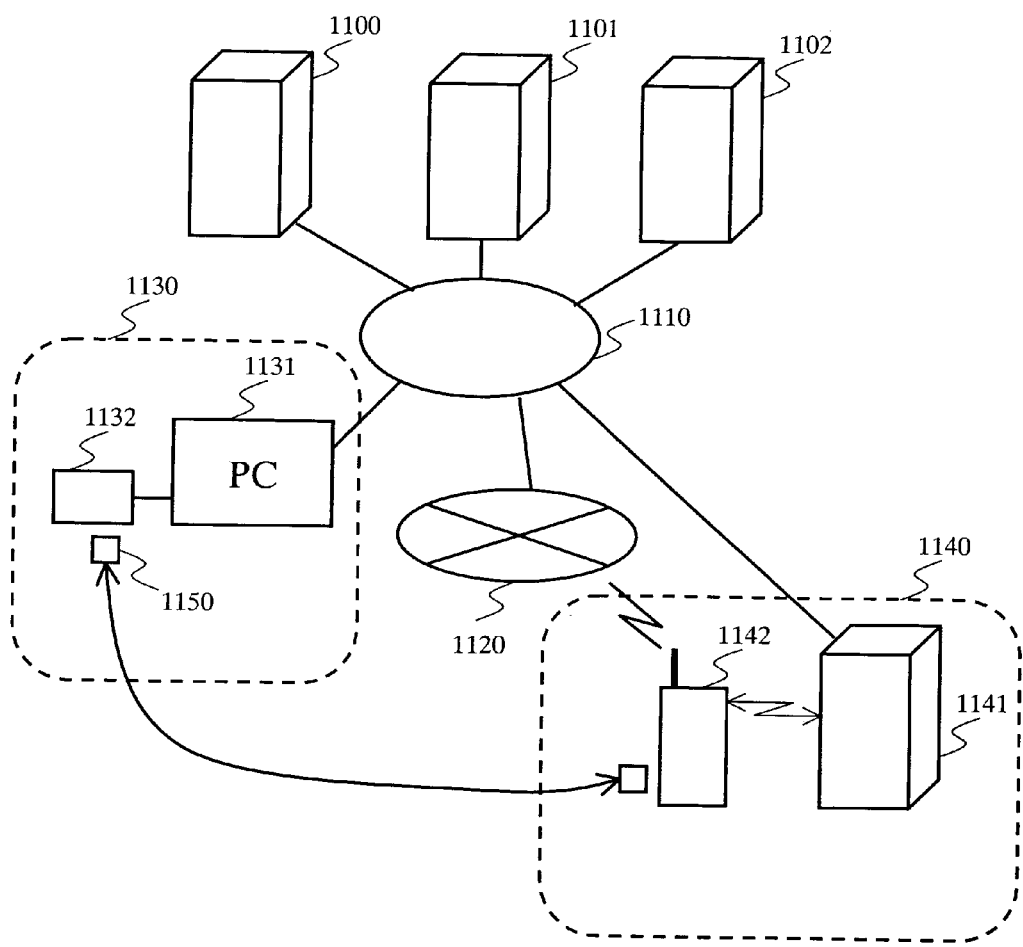
FIG. 15 is a schematic drawing of the case when the IC card of this invention is used in another device.

Next, FIG. 15 will be used to describe an example of the user using devices capable of using the IC cards 10a to 10f (here, the reference number 1150 will be assigned to the IC card).

In this example, a ticket server 1100, credit server X1101 and credit server X1102 are connected to the Internet 1110, and the servers provide a concert-ticket sales service, settlement service for credit company X and settlement service for credit company Y, respectively.

It is assumed that the user uses an IC card 1150 to reserve a concert ticket. Here, the user first inserts the IC card 1150 into the cardholder 1132 (same type of cardholder as shown in FIG. 3) that is connected to a personal computer PC 1131 at the user's home 1130. Before inserting the card, the user can use the switch installed in the IC card 1150 (the switch is not shown in the figure, but is the same as that shown in FIG. 1 and FIG. 2) to select the company from which the credit service will be received.

Next, the user connects to the ticket server 1100, and reserves the desired concert ticket and purchases an electronic ticket. At this time, the ticket payment is processed by the company whose credit service is being received and that was set by the switch beforehand on the IC card 1150. In the case that the user forgets the company whose credit service was set on the IC card 1150, it is possible to check by looking through the insert slot of the cardholder 1132 at the position of switch or the ON/OFF status of the LEDs (not shown in the figure but are the same as those shown in FIG. 4 and FIG. 5). Also, it is possible to check the security condition of the service currently being received by looking the ON/OFF status of the LEDs as described in the sixth embodiment. Moreover, when it is desired to change the company whose credit service is being received, it is possible to use an appropriate tool for changing the position of the switch on the IC card 1150 through the insert slot. Since the position of the switch can only be changed by using the tool through the insert slot in this way, it is safe from a security aspect and can also correspond to special conditions.

The user downloads the data for the concert ticket from the ticket server 1100 to the IC card 1150 in this way, and payment for the ticket is processed by the credit server 1101 corresponding to the credit company that was set for the IC card 1150 beforehand.

Next, the situation of using the concert ticket, which was purchased by the user and downloaded to the IC card 1150, with a mobile telephone 1142 will be considered. In the case of using the concert ticket at a different place like this, the ticket data are stored in the user's IC card 1150, so safety can be maintained. This is because when the ticket data are stored on a network server, there is a threat of hacking.

Next, the user takes the ticket to the concert hall 1140 and enters the hall, and the purchased concert ticket can be verified using the mobile telephone 1142. A ticket reader 1141 is used to verify the ticket at the concert hall 1140, and exchanging data with the mobile telephone 1142 can be performed for example by close-range wireless transmission.

Furthermore, in the case that the user desires to change the type of ticket at the concert hall, payment for the balance due can be processed from the mobile phone 1142 over a public line 1120 using credit server 1102 for example.

In this case, the IC card 1150 is left inserted in the mobile phone 1142 and checking and changing the credit service company that was set beforehand is possible by looking at the position of the switch or ON/OFF status of the LEDs through the insert slot as described above.

In this example a personal computer 1131 and cardholder 1132 were used at home to reserve the concert ticket, however it is also possible to use the electronic-commerce function of the mobile phone 1142. In that case, the user can reserve a concert ticket on the move instead of from home 1130.

Moreover, in this example, the concert ticket was verified at the concert hall 1140 using the mobile phone 1142, however, the same process is possible by inserting only the IC card 1150 into the card reader (not shown in the figure) of the ticket reader 1141.

The shape of the cardholder 1150 and the cardholder in the mobile phone 1142 (not shown in the figure) can be like that of the cardholder 21 or cardholder 22 shown in FIG. 3 and FIG. 8.

In the case of cardholder 21, it is possible to check position of the switch SW and the ON/OFF status of the LEDs on the vertical surface S from the insert slot (in the direction of the arrow in FIG. 3). It is also possible to change the position of the switch SW through the insert slot (in the direction shown by the arrow in FIG. 3) using an appropriate tool. Moreover, since it is dark inside the cardholder 21, it is possible to check the ON/OFF status of the LEDs even when the light-emission is low, and by forming a mirror surface as explained above, it is possible to lower the intensity of the light-emission of the LEDs even more.

In the case of cardholder 22, it is possible to check the position of the switch SW and the ON/OFF status of the LEDs on the vertical rising surface S or slanted rising surface SS through a through hole 12 on the insert surface (top in FIG. 8), and it is possible to changed the position of the switch SW through the through hole 12 using an appropriate tool. Moreover, since it is dark inside the cardholder 22, it is possible to check the ON/OFF status of the LEDs even when the light-emission is low, and by forming a mirror surface as explained above, it is possible to lower the intensity of the light emission of the LEDs even more. Furthermore, by making the second main-body part of the IC card 1150 transparent instead of forming a through hole 12, the position of the switch SW and the ON/OFF status of the LEDs can be checked, however, it is not possible to change the position of the switch SW. Typically, a mobile phone 1142 is used in a mobile environment, and there are many chances for it to come in contact with external devices, so there are situations when a method of making it impossible to physically change the position of the switch in this way can be effective.

As described above, by using a device that is capable of using an IC card, can receive various services from one IC card in a mobile environment.

With the invention described above, in the case of a card such as JavaCard (R) that is capable of providing a plurality of services on one card, a switch for selecting a specific service from among the plurality of services is disposed on the side of the IC card instead of on the side of an external device, so the user can easily select a desired service, and according to the position of the switch is possible to check which service is provided from the IC card without having to connect the card to an external device.

Moreover, a display unit for displaying the status of the IC card is similarly disposed on the side of the IC card, so it is possible to easily check which service the IC card is providing and the level of security for that service.

Particularly, by disposing the switch or display unit on the vertical rising surface of the stepped part where the first main-body part protrudes on the second surface side, it is possible to check the switch or display unit on the vertical surface through the insert slot when the card is inserted into the card holder from the first main-body part.

Also, by making the rising surface to the first main-body part a slanting surface that slants in a direction such that it spreads in a tapered shape over the second main-body part as it goes from first surface side toward the second surface side, or by forming a mirror surface on part or all of the second surface of the second main-body part, or by making all or part of the second main-body part transparent, or by forming a through hole in part of the second main-body part, it is possible to further improve the ability to make a visual check.

What is claimed is:

1. An IC card capable of executing a plurality of applications corresponding to services, the IC card comprising:
    an interface for an external device;
    a memory unit operable to store information of the applications corresponding to the services;
    a switch that changes over to another service; and
    a CPU that executes the application corresponding to the service selected by the switch to provide the selected service to the external device by way of the interface; and
    a display unit operable to display a kind of the service provided to the external device; and
    wherein a main card body has a first thick plate-shaped main-body part and a second thin plate-shaped main-body part, a first surface of the main body is a continuous flat surface from the first main-body part to the second main-body part, and on a second surface side, the first main-body part protrudes; and
    wherein the switch and the display unit are disposed on the rising surface of a stepped part where the first main-body part protrudes on the second surface side.

2. An IC card according to claim 1, wherein the rising surface to the first main-body part is a slanted surface that extends in tapered shape over the second main-body part with rising in the direction from the first surface side toward the second surface side.

3. An IC card according to claim 1, wherein the switch is a position switch of which a position can be changed among positions corresponding to the services.

4. An IC card according to claim 3, further comprising an access control unit, coupled to the switch, the memory unit, and the CPU, operable to select one of memory areas in the memory unit according to the position of the switch, the memory areas each storing an application, and allow the CPU to access the selected memory area.

5. An IC card according to claim 3, further comprising an electric contact with the external device on the first main-body part, and
    wherein the rising surface faces toward an insert slot of the external device when the IC card is mounted in a cardholder of the external device.

6. An IC card capable of executing a plurality of applications corresponding to services, the IC card comprising:
    an interface for an external device;
    a memory unit operable to store information of the applications corresponding to the services;
    a switch that changes over to another service; and
    a CPU that executes the application corresponding to the service selected by the switch to provide the selected service to the external device by way of the interface; and
    a display unit operable to display a kind of the service provided to the external device; and
    wherein a main card body has a first thick plate-shaped main-body part and a second thin plate-shaped main-body part, a first surface of the main body is a continuous flat surface from the first main-body part to the second main-body part, and on a second surface side, the first main-body part protrudes; and
    wherein a mirror surface is formed on all or part of the second main-body part.

7. An IC card capable of executing a plurality of applications corresponding to services, the IC card comprising:
    an interface for an external device;
    a memory unit operable to store information of the applications corresponding to the services;
    a switch that changes over to another service; and
    a CPU that executes the application corresponding to the service selected by the switch to provide the selected service to the external device by way of the interface; and
    a display unit operable to display a kind of the service provided to the external device; and
    wherein a main card body has a first thick plate-shaped main-body part and a second thin plate-shaped main-body part, a first surface of the main body is a continuous flat surface from the first main-body part to the second main-body part, and on a second surface side, the first main-body part protrudes; and
    wherein all or part of the second main-body part is transparent, or a through hole is formed in part of the second main-body part.

* * * * *